United States Patent
Richter et al.

(10) Patent No.: US 8,790,502 B2
(45) Date of Patent: Jul. 29, 2014

(54) TITANIA NANOTUBES PREPARED BY ANODIZATION IN CHLORIDE-CONTAINING ELECTROLYTES

(75) Inventors: Christiaan Richter, Boston, MA (US); Latika Menon, Boston, MA (US); Ronald J. Willey, Dedham, MA (US)

(73) Assignee: Northeastern University, Boston, MA (US)

( * ) Notice: Subject to any disclaimer, the term of this patent is extended or adjusted under 35 U.S.C. 154(b) by 605 days.

(21) Appl. No.: 12/527,889

(22) PCT Filed: Feb. 21, 2008

(86) PCT No.: PCT/US2008/002282
§ 371 (c)(1),
(2), (4) Date: Aug. 20, 2009

(87) PCT Pub. No.: WO2008/127508
PCT Pub. Date: Oct. 23, 2008

(65) Prior Publication Data
US 2010/0024879 A1    Feb. 4, 2010

Related U.S. Application Data

(60) Provisional application No. 60/902,448, filed on Feb. 21, 2007.

(51) Int. Cl.
*B01J 38/18*    (2006.01)
(52) U.S. Cl.
USPC ............. 205/50; 423/610; 502/350; 977/899
(58) Field of Classification Search
USPC .................. 423/610; 977/762, 899, 811, 776; 205/50, 74; 204/242; 502/350
See application file for complete search history.

(56) References Cited

U.S. PATENT DOCUMENTS 6,252,105 B1    6/2001    Braun et al.
6,400,091 B1    6/2002    Deguchi et al.
(Continued)

FOREIGN PATENT DOCUMENTS

EP    1 726 567    2/2006
JP    2003/041359    9/2004
(Continued)

OTHER PUBLICATIONS

Oh et al., Growth of nano-scale hydroxyapatite using chemically treated titanium oxide nanotubes, 2005, Biomaterials, 26, 4938-4943.*

(Continued)

*Primary Examiner* — Kaj K Olsen
*Assistant Examiner* — Pritesh Darji
(74) *Attorney, Agent, or Firm* — McLane, Graf, Raulerson & Middleton, PA

(57) ABSTRACT

A method of preparing titania nanotubes involves anodization of titanium in the presence of chloride ions and at low pH (1-7) in the absence of fluoride. The method leads to rapid production of titania nanotubes of about 25 nm diameter and high aspect ratio. The nanotubes can be organized into bundles and tightly packed parallel arrays. Inclusion of organic acids in the electrolyte solution leads to the incorporation into the nanotubes of up to 50 atom percent of carbon. In a two-stage method, a titanium anode is pre-patterned using a fluoride ion containing electrolyte and subsequently anodized in a chloride ion containing electrolyte to provide more evenly distributed nanotube arrays. The titania nanotubes have uses in composite materials, solar cells, hydrogen production, and as hydrogen sensors.

32 Claims, 8 Drawing Sheets

(56) References Cited

U.S. PATENT DOCUMENTS

| | | |
|---|---|---|
| 6,682,677 B2 | 1/2004 | Lobovsky et al. |
| 2004/0076681 A1 | 4/2004 | Dennis et al. |
| 2004/0227087 A1 | 11/2004 | Markham et al. |
| 2006/0099456 A1 | 5/2006 | Redepenning |
| 2006/0179627 A1 | 8/2006 | Sakai et al. |
| 2009/0035213 A1* | 2/2009 | Takayasu et al. ............. 423/609 |

FOREIGN PATENT DOCUMENTS

| | | |
|---|---|---|
| WO | WO 2004/057070 | 7/2004 |
| WO | WO 2007023543 A1 * | 3/2007 |

OTHER PUBLICATIONS

Cortes-Jacome et al., In situ thermo-Raman study of titanium oxide nanotubes, 2007, Catalysis Today, 126, 248-255.*

Bala et al., Controlling the particle size of nanocrystalline titania via a thermal dissociation of substrates with ammonium chloride, 2006, Materials Letters, 60, 494-498.*

Sul et al., The electrochemical oxide growth behaviour on titanium in acid and alkaline electrolytes, 2001, Medical Engineering & Physics, 23, 329-346.*

"Titania Nanotube Arrays Harness Solar Energy"; (2006); PhysOrg.; Retrieved from the internet http://www.physorg.com/news10244.

Richter et al., "Ultrahigh-Aspect-Ratio Titania Nanotubes", Advanced Materials, 2007, 19, 946-948.

Gong et al., "Titanium oxide nanotube arrays prepared by anodic oxidation", J. Mater. Res., vol. 16, No. 12, Dec. 2001, 3331-3334.

Raja et al., "Formation of self-ordered nano-tubular structure of anodic oxide layer on titanium", Electrochimica Acta 51 (2005) 154-165.

Menon et al., "Synthesis of Nanomaterials using self-assembled nonotemplates", Journal of Nanoscience and Nanotechnology, vol. 12, 1-19, 2012.

Rani et al., "Synthesis and applications of electrochemically self-assembled titania nanotube arrays", J. Phys. Chem. Chem. Phys., 2010, 12, 2780-2800.

Macak et al., "Smooth anodie, TiO2 nanotubes", Angew. Chem.Int. Ed. 2005, 44, 7463-7465.

* cited by examiner

FIG. 2a
FIG. 2b
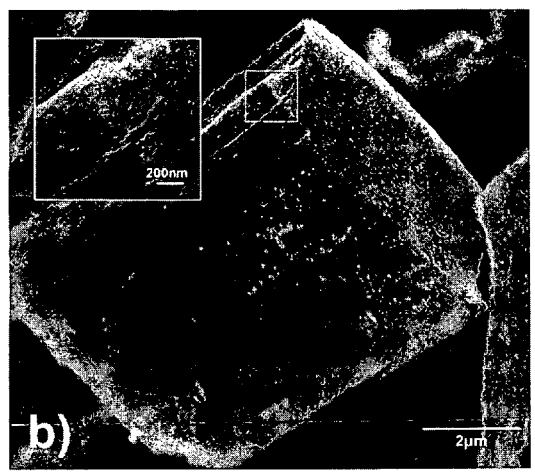
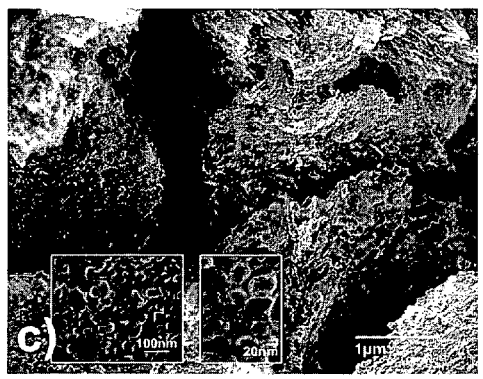
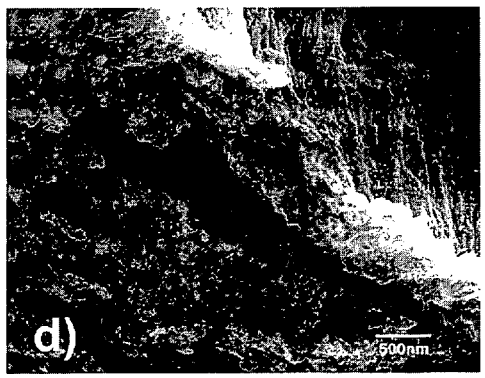
FIG. 2c
FIG. 2d

*FIG. 8a*
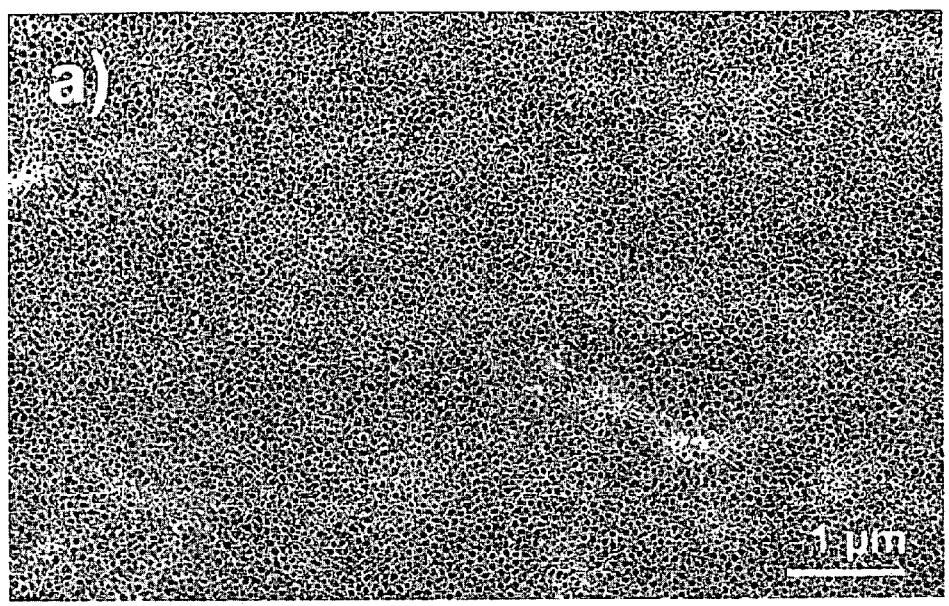
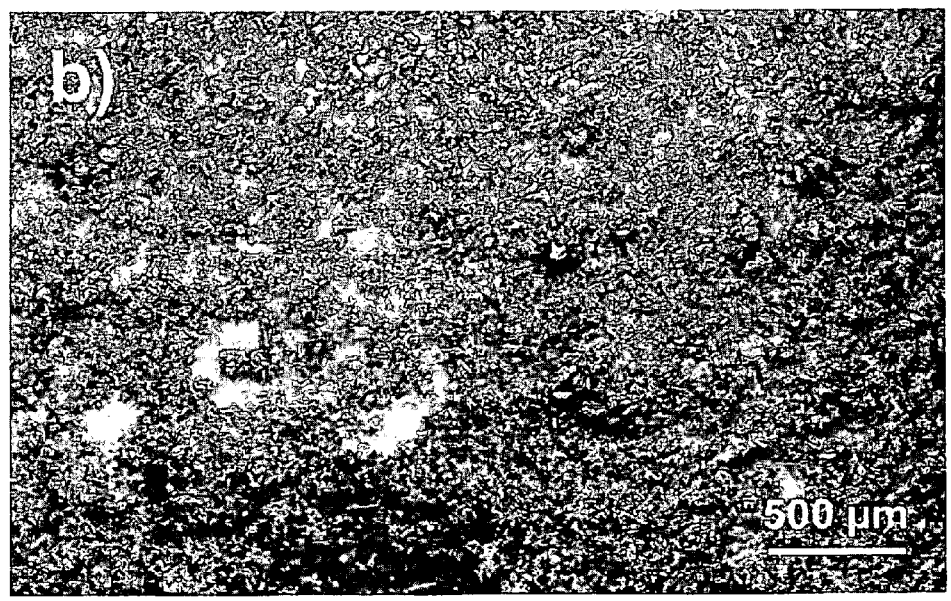
*FIG. 8b*

TITANIA NANOTUBES PREPARED BY ANODIZATION IN CHLORIDE-CONTAINING ELECTROLYTES

CROSS REFERENCE TO RELATED APPLICATIONS

This application claims the benefit of U.S. Provisional Application No. 60/902,448, entitled "High Aspect Ratio Titania Nanotubes Fabricated in Chlorine Based Electrolytes," filed Feb. 21, 2007, the entire contents of which are incorporated herein by reference.

STATEMENT REGARDING FEDERALLY SPONSORED RESEARCH OR DEVELOPMENT

This invention was made with support from Grants ECS-0551468 and BES-0608892 from the National Science Foundation. The U.S. Government may have certain rights in the invention.

BACKGROUND OF THE INVENTION

Titania (i.e., titanium dioxide) nanotubes have shown promise for use in photocatalytic (refs. 1-3), sensor (refs. 4 and 5), biological (ref 6) and other applications. Titania nanotube arrays for such applications have been fabricated by anodization in fluoride-containing media. Zwilling & Darque-Ceretti reported in 1997 that ordered nanoporous structures could be obtained by anodizing titanium in fluoride containing electrolytes (refs. 7 and 8). In 2001, Grimes and co-workers found that titania nanotubes could also be obtained given suitable anodization conditions in hydrofluoric acid (HF) (ref. 9). The need for longer nanotubes led the research groups of Grimes et al. (ref. 10) and of Schmuki et al. (ref. 11) to pioneer the growth of longer titania nanotubes using more alkaline electrolytes with fluoride salts (NaF, KF, $NH_4F$) instead of HF as the fluoride source, and the use of non-aqueous fluoride containing electrolytes (refs. 12-14). In 2005, Nakayama et al. reported that titania nanotubes can be obtained by anodization in a perchloric acid solution (ref. 15). In addition to titania nanotubes produced by anodization, fibrous titanates including $TiO_2$—B nanotubes have been fabricated by a chemical-thermal route, which is typically a variation on the NaOH treatment first used to fabricate nanotubes by Kasuga et al. (ref. 17). Fibrous titanates have found industrial use as a strengthening additive in composite materials (ref. 16).

Previous methods of producing titania nanotubes yield slow growth, and result in nanotubes of limited aspect ratio and structural organization. Anodization of titanium has previously required catalysis by fluoride ions, with no success obtained using other ions for catalysis. There remains a need for improved titanium anodization methods that allow rapid growth and the formation of highly organized arrays of titania nanotubes.

BRIEF SUMMARY OF THE INVENTION

The invention provides a new method of preparing titania nanotubes by anodization of titanium metal in chloride ion-containing electrolytic solutions. The method results in very rapid formation of titania nanotubes, and the nanotubes grow to tens or hundreds of microns in length and attain high aspect ratios. The titania nanotubes formed by the methods of the invention can spontaneously organize into tightly packed parallel arrays of nanotubes. The nanotubes can be doped with high levels of carbon by inclusion of organic acids in the electrolyte solution. The titania nanotubes prepared according to the method of the invention are suitable for use in solar cells for the production of hydrogen, as hydrogen sensors, and as a strengthening agent in composite materials.

One aspect of the invention is a method of preparing titania nanotubes by anodization of titanium in a chloride-containing electrolyte. The method includes the steps of (a) providing a titanium anode, an inert cathode, and an electrolyte solution electrically connecting the anode and the cathode; and (b) establishing a voltage between the anode and the cathode, whereby titania nanotubes are formed at the anode. The electrolyte solution contains at least about a 1 mM concentration of free chloride ion, and has a pH in the range from about 1 to about 7. In certain embodiments, the electrolyte solution contains either a chloride-containing salt or a chloride-containing acid, or both. In some embodiments the electrolyte solution contains a mineral acid or an organic acid, such as a carboxylic acid. The anodization conditions, including the chloride ion concentration, the pH, and the voltage between the electrodes (i.e., anodization voltage) are balanced to favor rapid formation of titania nanotubes. In one embodiment, the electrolyte solution contains at least 0.4M of a chloride salt and has a pH of about 1.5, and the anodization voltage is at least about 11 volts.

Another aspect of the invention is a plurality or set of titania nanotubes that can be made by the anodization method described above. In certain embodiments, the nanotubes have a length of at least 200 nm and an aspect ratio of at least 10. In some embodiments, the nanotubes contain a mole fraction of titania of at least 50% and have an aspect ratio of at least 10. In other embodiments, the nanotubes contain from 0 to about 20 atom % or from 0 to about 50 atom % of carbon. In some embodiments, the nanotubes are present as loosely associated, approximately parallel bundles of nanotubes. In other embodiments, the nanotubes are present as tightly packed parallel arrays of nanotubes. In some embodiments, the parallel arrays of nanotubes are in the form of grains or rods.

Yet another aspect of the invention is a method of producing titania nanotubes having a desired carbon content between about 0 atom % and about 40 atom % of carbon. The method includes the steps of: (a) preparing a first set of nanotubes according to the method described above, wherein the electrolyte solution comprises a mixture of an inorganic acid and an organic acid; (b) determining the carbon content of the nanotubes so produced; and (c) preparing a second set of nanotubes with a different mixture of an inorganic acid and an organic acid, wherein increasing the proportion of the organic acid relative to the inorganic acid increases the carbon content of the second set of nanotubes, and decreasing the proportion of the organic acid relative to the inorganic acid decreases the carbon content of the second set of nanotubes.

Still another aspect of the invention is a method of adjusting the carbon content of titania nanotubes between about 20 atom % and about 50 atom % of carbon. The method includes the steps of: (a) preparing a first set of nanotubes according to the first method described above, where the electrolyte solution includes a mixture of an inorganic acid, trichloroacetic acid as a first carboxylic acid and a second carboxylic acid; (b) determining the carbon content of the nanotubes; and (c) preparing a second set of nanotubes with a different mixture of trichloroacetic acid and the second carboxylic acid in the electrolyte solution, wherein increasing the proportion of trichloroacetic acid relative to the second carboxylic acid increases the carbon content of the second set of nanotubes, and decreasing the proportion of trichloroacetic acid relative to the second carboxylic acid decreases the carbon content of the second set of nanotubes.

In yet another aspect, the invention provides a method of pre-conditioning a titanium surface for the formation of titania nanotubes in a chloride-containing electrolyte solution. The method includes the steps of: (a) providing a titanium anode and an inert cathode, the anode and cathode in electrical contact through an electrolyte solution comprising about 0.5 wt % of hydrofluoric acid and, preferably, free of chloride ions; and (b) establishing a voltage between the anode and the cathode, whereby the titanium surface is pre-conditioned for the formation of titania nanotubes in a chloride-containing electrolyte solution.

Another aspect of the invention is a kit for preparing titania nanotubes. The kit includes a titanium anode, a cathode, an electrolyte solution containing at least about 1 mM chloride and having a pH in the range of about 1 to about 7, and instructions for preparing titania nanotubes according to the first method described above.

Still another aspect of the invention is a kit for preparing titania nanotubes. The kit includes a titanium anode, a cathode, and instructions for preparing titania nanotubes according to the first method described above, using a user-supplied chloride-containing electrolyte solution.

Yet another aspect of the invention is a kit for preparing titania nanotubes. The kit includes a cathode, an electrolyte solution containing at least about 1 mM chloride and having a pH in the range of about 1 to about 7, and instructions for preparing titania nanotubes according to the first method described above, with a user-supplied titanium anode.

Even another aspect of the invention is a kit for preparing titania nanotubes. The kit includes an electrolyte solution containing at least about 1 mM chloride and having a pH in the range of about 1 to about 7, and instructions for preparing titania nanotubes according to the first method described above, with a user-supplied titanium anode and a user-supplied cathode.

Another aspect of the invention is a solar cell containing an array of titania nanotubes fabricated by any of the above-described methods.

Still another aspect of the invention is a hydrogen sensor containing an array of titania nanotubes fabricated by any of the above-described methods.

Yet another aspect of the invention is a hydrogen generator containing an array of titania nanotube fabricated by any of the above-described methods.

BRIEF DESCRIPTION OF THE DRAWINGS

Other features and advantages of the invention will be apparent from the following description of the preferred embodiments thereof and from the claims, taken in conjunction with the accompanying drawings.

FIG. 2 shows scanning electron microscopy (SEM) images of different views of titania nanotube bundles formed by anodization of titanium sheets in chlorine containing electrolytes. FIG. 2A shows bundles of titania nanotubes loosely ordered in one direction; the bundles were up to 10 μm long and 3 μm wide. FIG. 2B shows tightly packed titania nanotubes forming ordered grains with quasi-rectangular facets. FIG. 2C shows a top view of titania nanotube agglomerations. FIG. 2D shows large formations of nanotubes having a preferred growth direction.

FIG. 3A shows disordered agglomerations of relatively short titania nanotubes (less than 500 nm in length). FIG. 3B shows disordered agglomerations of long titania nanotubes. FIG. 3C shows titania nanotubes loosely packed in a single direction, with the formation of bundles. FIG. 3D shows tightly packed titania nanotubes organized in one preferred direction, allowing the formation of grains. FIG. 3E shows tightly packed titania nanotubes with two perpendicular preferred directions, allowing the formation of interwoven bundles. FIG. 3F shows a top view of a titania nanotube bundle, clearly showing the tubular aspect of the constituent nanotubes.

FIG. 6 shows the results of varying the chloride concentration in the electrolyte on the plateau anodization current.

FIG. 8A shows an SEM image of the surface of a titanium anode after a first anodization in HF solution. FIG. 8B shows an SEM image of the surface of the titanium anode from FIG. 8A after a second anodization in ammonium chloride/HCl solution.

DETAILED DESCRIPTION OF THE INVENTION

According to a new method of preparing titania nanotubes, titanium metal is anodized in a chloride ion-containing electrolyte, resulting in the very rapid formation of titania nanotubes of high aspect ratio. The nanotubes can grow to tens or hundreds of microns in length and form highly ordered arrays. Titania nanotubes formed by the method can be modified to include low levels or high levels of carbon by inclusion of organic acids in the electrolyte solution. The titania nanotubes prepared according to the method of the invention are suitable, e.g., for use in solar cells for the production of hydrogen, as hydrogen sensors, and as a strengthening agent in composite materials.

Figure 1:
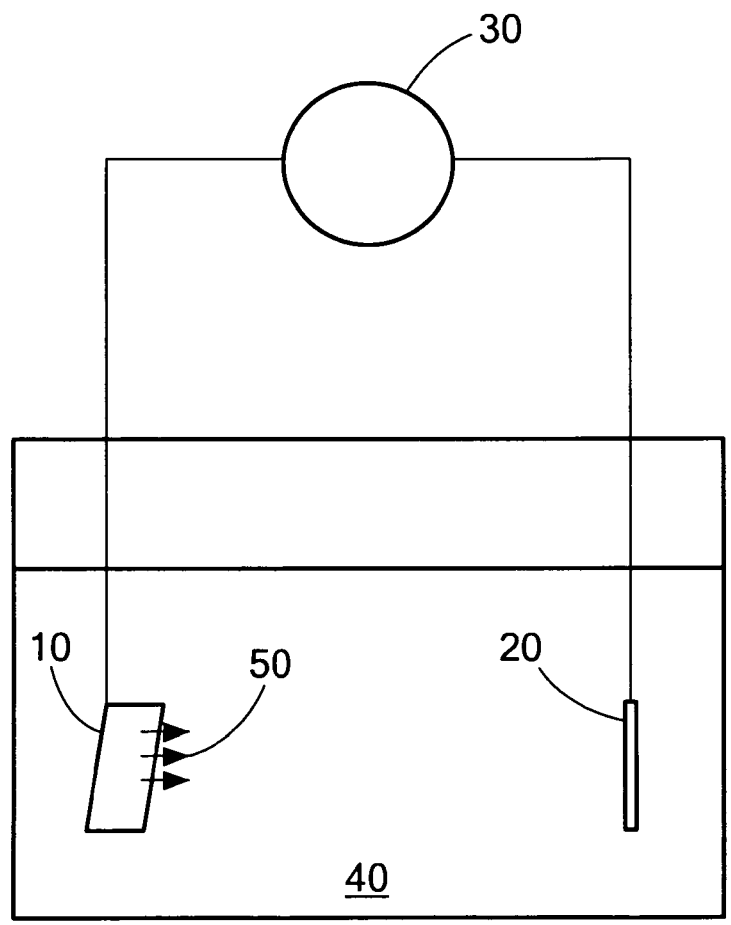
FIG. 1 is a schematic representation of a device for preparing titania nanotubes by anodization in a chloride-containing electrolyte.

Referring now to FIG. 1, a device for carrying out a method of forming titania nanotubes according to the invention includes titanium metal anode 10, which is electrically coupled to inert cathode 20 through voltage source 30, which establishes an electrical potential between electrodes 10 and 20. The electrodes are electrically coupled through electrolyte solution 40. Upon establishment of a voltage between the electrodes, current flows through the electrolyte solution, thereby completing the circuit and, when appropriate conditions are obtained, leading to the formation of titania nanotubes 50 on the surface of anode 10.

Voltage source 30 can be any source of electrical power that is capable of establishing an essentially constant voltage between anode 10 and cathode 20 for a period of at least several minutes to support the formation of titania nanotubes at the surface of the anode. For example, the voltage source can be a battery or a regulated power supply. Preferably, voltage source 30 is a regulated power supply capable of providing a user-selected, essentially constant voltage and maintaining the voltage setting through fluctuations of the anodization current. Alternatively, a voltage source can be a power supply operated in a constant current or constant power mode. Generally, a voltage source for use in the methods of the invention can supply a constant voltage in the range of about 0 to about 50V DC, and can supply a current in the range of at least 1.0 amp per $cm^2$ of anode surface area or higher. Preferably, the voltage source can supply a current of at least 10 amps per $cm^2$ of anode surface area. The user can select a suitable voltage source based on the anode surface area used, as well as the composition of electrolyte solution 40. The anodization current will vary depending upon not only on the size and nature of anode 10 and cathode 20, but also depending upon the ionic composition and salt concentration of electrolyte solution 40.

Anode 10 is fabricated from titanium metal. Preferably, the anode is an essentially pure (e.g., at least 80%, at least 90%, at least 95%, at least 98%, or at least 99% pure) titanium metal. Its form can be any form selected to suit the user's needs. For example, the titanium anode can be shaped so as to conform to a device where it later will be installed. A flat form, such as a thin metal foil, is preferred, however, as this maximizes the surface area available for nanotube formation. For example, a titanium foil of about 0.05, about 0.1, about 0.2, about 0.3, about 0.5, or about 1 mm thickness, or in the range of about 0.05-1.0 mm thickness can be used. A perforated foil, grid, or screen also can be used. Alternatively, the anode can be formed from one or more titanium wires. The overall size or surface area of the anode can be selected to suit the desired scale of titania nanotube production. For example, smaller scale operations or set-ups intended for experimental purposes might use a titanium anode on the order of 1 $mm^2$ or less, or up to 1 $cm^2$ or up to 100 $cm^2$. Alternatively, a titania nanotube production apparatus might use an anode of 1 $cm^2$ or more, 100 $cm^2$ or more, or even 1 $m^2$ or more. The anode can become degraded or partially, or even entirely, consumed during the anodization process, as its mass is converted into titania nanotubes.

Cathode 20 is an electrode that is formed preferably of an essentially inert, electrically conducting chemical substance, such as platinum or graphite. The form of the cathode is generally relevant only in that it needs to supply sufficient current to the electrolyte solution to support the anodization current required for the formation of titania nanotubes in the anodization process. The material of the cathode should be sufficiently inert to withstand the chemical conditions in the electrolyte solution, such as high salt concentrations of up to 1 M or more, and acidic pH as low as pH 1, without substantially degrading during the anodization process. The cathode preferably should not leach out any chemical substance that interferes with the anodization process or might lead to undesirable contamination of the titania nanotubes formed during anodization.

Electrolyte solution 40 provides ions to support the flow of current between anode 10 and cathode 20, but also provides chloride ions ($Cl^-$) that catalytically support the formation in titania nanotubes at the anode. The chloride concentration in the electrolyte solution is at least 1 mM, and in some embodiments it is at least 10 mM, at least 20 mM, at least 50 mM, at least 100 mM, at least 200 mM, at least 400 mM, at least 500 mM or even at least 1000 mM. In different embodiments, the chloride concentration can be in the range of about 1 mM to about 50 mM, about 1 mM to about 100 mM, about 1 mM to about 400 mM, or about 1 mM to about 1000 mM. The source of chloride ions in the electrolyte solution is from the dissociation of a chloride-containing salt or acid, or from another chloride donor. The chloride ion concentration can be determined using any available analytical method, such as the use of a chloride-sensitive electrode, or can be estimated based on knowledge of the concentration of the chloride donating compound together with knowledge of its dissociation constant. For many salts, at the concentration used in the electrolyte solution, dissociation is essentially complete, allowing the salt concentration to be taken as the free chloride concentration, taking into account the number of chloride ions per molecule of salt. In general, the chloride concentration needs only to be sufficient to provide catalysis of titania nanotube formation; precise knowledge or regulation of the chloride ion concentration in the electrolyte solution is usually not required. In some embodiments, the electrolyte solution is substantially free of fluoride ions. The solvent for the electrolyte solution can be water or another polar solvent such as dimethylsulfoxide, glycerol, formamide, or any mixture of polar solvents.

Any salt yielding chloride ions upon dissolution in the electrolyte solution can be used, provided that the other ions do not interfere with the nanotube formation process. Salts such as sodium chloride, potassium chloride, calcium chloride, and ammonium chloride are suitable. Acids that release chloride upon dissociation, such as hydrochloric acid, also can be used. Chloride salts and/or chloride acids also can be combined. When setting the chloride concentration in the electrolyte for a given use, the sum total of chloride ions from all sources is used. The electrolyte solution may contain other substances as desired for a particular application. In some embodiments, the electrolyte solution is substantially free of fluoride ions.

In order for chloride catalysis of nanotube formation to function efficiently, the pH of the electrolyte is set to within the range from about 1 to about 7. The rate of nanotube formation is considerably reduced at higher pH values. Preferably, the pH of the electrolyte solution is in the range from about 1 to about 5. In certain embodiments, the pH is set in the range from about 1 to about 2, or at about 1.5. An acid pH can be established by adding a mineral acid or an organic acid to the electrolyte solution. The acid concentration can be in the range from about 0 to about 1 M, or higher, and may depend on the dissociation constant of the acid as well as other components of the electrolyte solution. Examples of suitable mineral acids include hydrochloric acid and sulfuric acid. Examples of suitable organic acids include carboxylic acids such as oxalic, formic, acetic, trichloroacetic, and gluconic acids.

Figure 3:
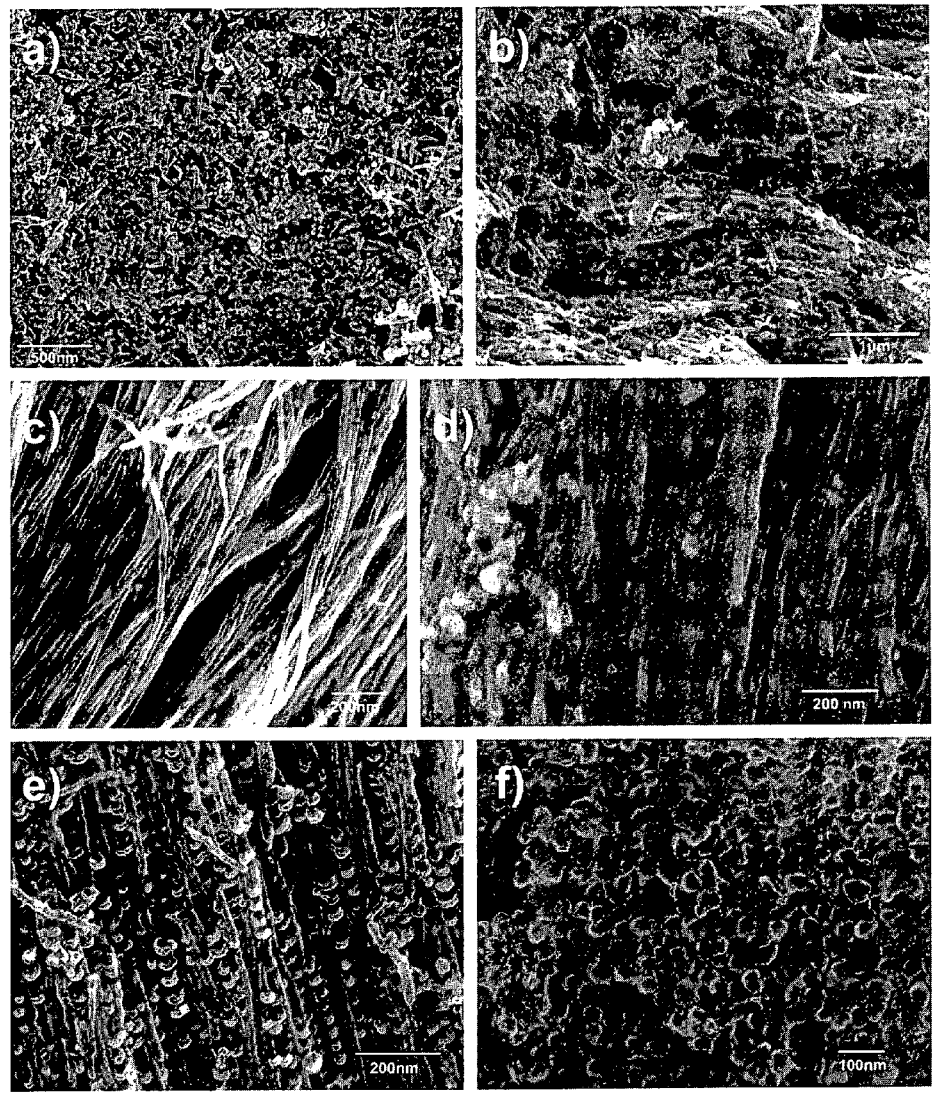
FIG. 3 shows SEM images of titania nanotubes with varying degrees of ordering.

When a voltage set by voltage source 30 was applied between anode 10 and cathode 20, nanotubes were observed to form preferentially around the edges of the titanium anode or around holes that became etched through the surface of the anode. Local fluctuations in the electric field occur at such locations. It appears that titanium is rapidly etched by the formation of nanotubes in these areas, with bundles of nanotubes being released continuously into the electrolyte. The tubes themselves were either relatively ordered in bundles up to 60 μm long, or were present as irregular agglomerations. SEM images of nanotube bundles are seen in FIG. 2. The bundles sometimes consist of nanotubes that are packed parallel to each other along one direction, and sometimes consist of interwoven arrays of tubes arranged in perpendicular directions. Both types of structures (parallel and interwoven) often can be found on the same sample, and the appearance of one structure or the other does not appear to be related to general anodization conditions, but rather to specific localized conditions. Several images showing the various morphologies and orientations of titania nanotubes prepared according to the method described herein are presented in FIG. 3.

For titania nanotubes fabricated by prior methods of anodization in fluorine media, the nanotube (or pore) diameter increases steadily with an increase in anodization voltage (refs. 9 and 10). This is not the case for the nanotubes fabricated in chlorine media. There appears to be no significant variation of nanotube diameter with voltage with the present method. Diameters of all tubes were typically between 15 and 35 nm, with an average diameter of about 25 nm. Wall thickness was typically around 5 nm. Average diameters for different acids and anodization voltages are summarized in Table 2 below. Nanotube length appears to be a function not so much of anodization time or conditions (for instance acidity or voltage) but of where the rapidly forming tube bundles break. The upper limit of tube length observed in one set of experiments (around 60 μm) was approximately half the initial foil thickness. Longer tubes can be grown using thicker titanium foil and conditions optimized for stability (e.g., gentle stirring of the electrolyte).

Figure 4:
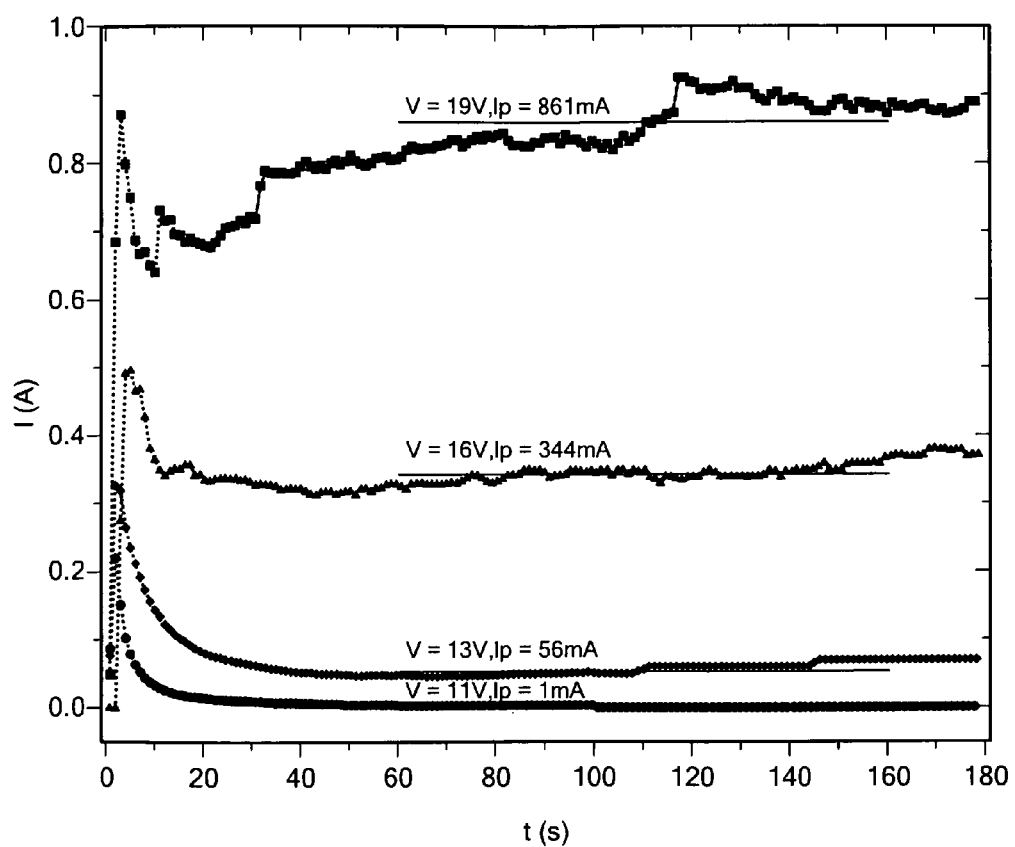
FIG. 4 shows plots of anodization current versus time. The plateau current, which is shown as a horizontal line, was calculated as an average of the anodization current over the 100 second interval from t=60 s to t=160 s. The anodization was carried out in an electrolyte solution containing 0.5M gluconic acid and 0.4M ammonium chloride at the indicated voltages.
Figure 5:
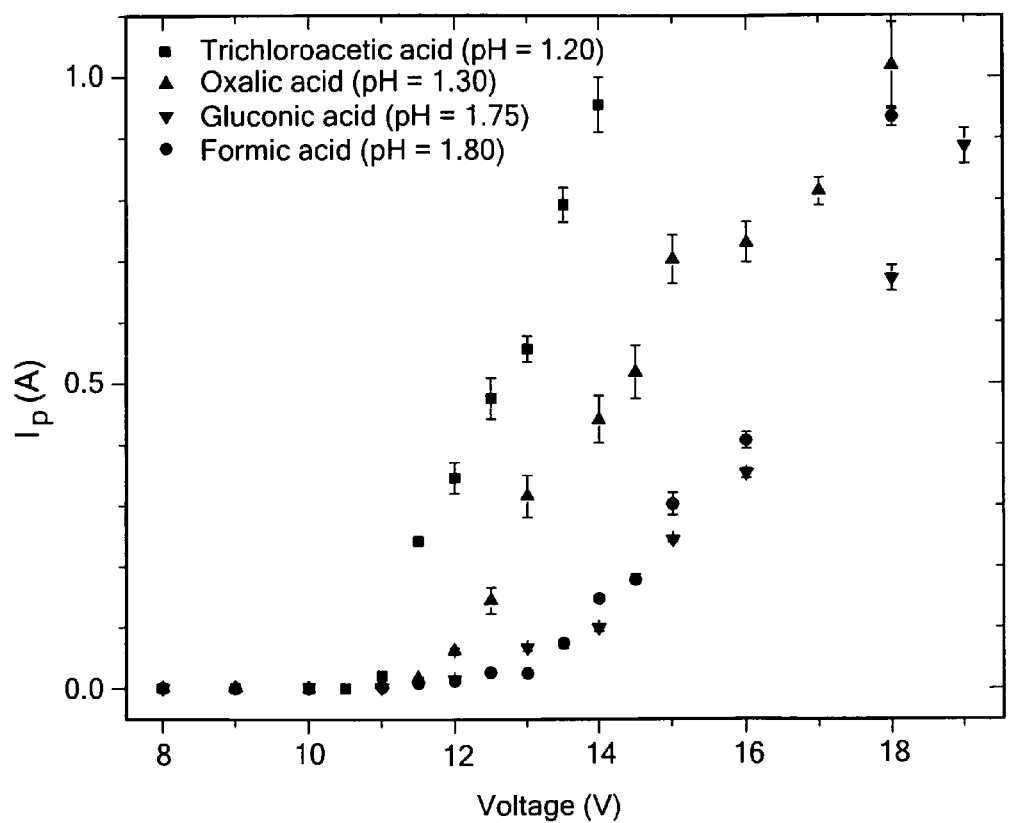
FIG. 5 is a plot of the plateau current versus anodization voltage for different organic acids. The plateau current was calculated as an average of the anodization current over the 100 second interval from t=60 s to t=160 s.
Figure 6A:
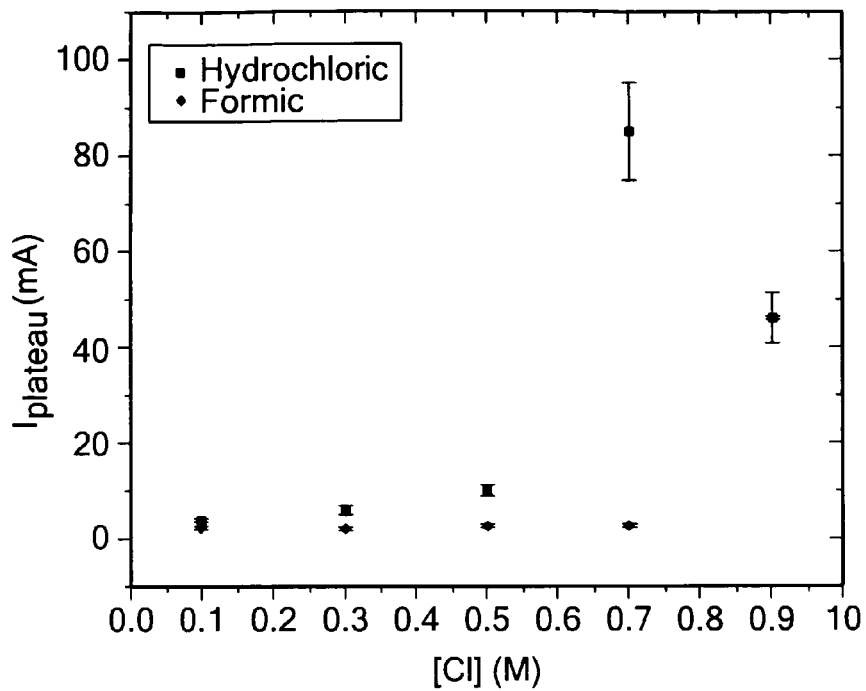
FIG. 6A shows an experiment conducted with an anodization voltage of 11V.
Figure 6B:
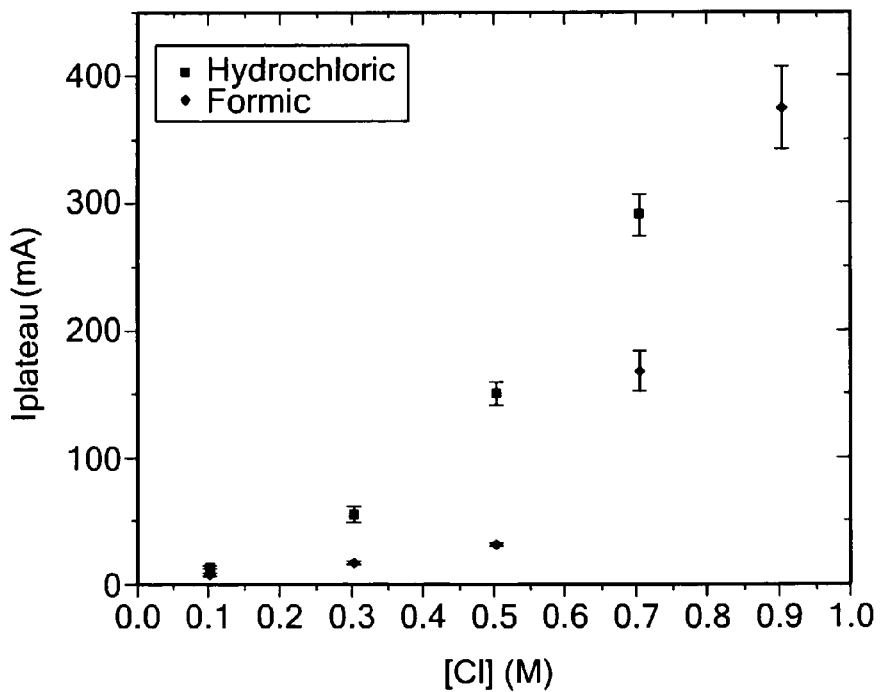
FIG. 6B shows the results using an anodization voltage of 13V. In both figures, the upper traces were obtained using HCl as the source of chloride ions, and the lower traces were obtained using ammonium chloride adjusted to pH 1-3 with formic acid.

The anodization voltage for forming nanotubes can be varied over a considerable range, but for any given electrolyte solution, there generally exists a minimum threshold voltage below which nanotube formation does not occur. The anodization voltage can be, for example, in the range from about 10V to about 20V, or at least about 11V. The threshold voltage depends on properties of the electrolyte, especially the chloride ion concentration. An example of threshold voltage behavior is illustrated in FIG. 4, which depicts the anodization current as a function of time using an electrolyte solution containing 0.5M gluconic acid and 0.4M ammonium chloride at the indicated voltages. In this case, above a threshold of about 11V, the anodization current increases. As can be seen in FIG. 5, the threshold voltage for the onset of nanotube formation may depend on the acidity and chloride ion concentration of the electrolyte. From FIG. 6, it can be observed that the threshold voltage decreased at higher chloride concentration in the electrolyte.

The chemistry and underlying mechanism by which the nanotubes form is very rapid, and the formation of nanotubes is several orders of magnitude faster than in a fluoride-containing electrolyte. The anodization current density is typically high (around 0.5 A/cm$^2$) and the electrolyte bubbles vigorously at the cathode, most likely due to the evolution of $H_2$. A distinct chlorine smell suggests that $Cl_2$ is also generated.

The presence of chloride ions and a low pH are essential aspects of an electrolyte for titania nanotube formation according to the present method. In non-electrochemical systems, it is well documented that the combination of chlorine and $TiO_2$ alone is unreactive. Without intending to limit the invention to any particular mechanism, it appears that chloride ions, above the threshold anodization voltage and at low pH, have the effect of inhibiting the formation of a passifying layer of $TiO_2$, resulting in greater inward migration of $O_2$ and oxidation of Ti to $TiO_2$. The initial spike of anodization current, visible in each trace of FIG. 4, corresponds to the formation of an initial passifying oxide layer. In the absence of Cl$^-$, and below the threshold anodization voltage, the oxide layer inhibits further oxidation of Ti, and nanotubes of $TiO_2$ do not form. It is believed that under the conditions of nanotube formation according to the invention, chloride reduces the thickness of the oxide layer.

When only one or more inorganic acids is used in the electrolyte, the composition of the titania nanotubes that form by anodization, as analyzed by energy dispersive X-ray analysis, is found to be nearly pure $TiO_2$, with only a small percentage of Cl or other elements that were present in the electrolyte solution. See Table 3. However, the use of one or more organic acids in the electrolyte results in the incorporation of significant amounts of carbon, ranging from 0 to about 50 atom %. The addition of carbon to titania nanotubes is thought to involve the incorporation of carbon atoms in the place of oxygen in the titania lattice, and/or the adsorption of carbon onto the surface of the nanotubes. The addition of carbon to titania nanotubes can be useful in their application to solar cell technology, where the presence of carbon is thought to aid in shifting the energy band gap to correspond more closely to the spectrum of sunlight, and to result in substantially increased energy conversion efficiency for the production of hydrogen with solar power.

Thus, the formation of titania nanotubes according to the invention can be modified so as to include a desired amount of carbon in the resulting nanotubes. In one embodiment of the method, titania nanotubes can be prepared having a carbon content ranging from about 0 to about 20, or even to about 40 or 50 atom % of carbon. An electrolyte is prepared containing an acid. In order to add carbon to titania nanotubes, the electrolyte can contain an organic acid, such as a carboxylic acid. As can be seen from the results presented in Table 3 below, the presence of a carboxylic acid in the electrolyte solution results in about 20 atom % carbon, regardless of the type of carboxylic acid. Carbon contents between 0 and about 20 atom % can be achieved by admixing an organic acid with an inorganic (i.e., mineral) acid. even higher carbon contents up to about 50 atom % can be achieved by admixing trichloroacetic acid into the electrolyte solution, for example, together with one or more non-chlorine containing carboxylic acids, or with a mixture of organic and inorganic acids.

In another embodiment, the carbon content of titania nanotubes can be adjusted in the range from about 0 to about 20 atom %. First, titania nanotube containing carbon are prepared by a method described above. If a chlorine-free carboxylic acid is used, then the resulting nanotubes will contain approximately 20 atom % of carbon, regardless of which carboxylic acid is used (see Table 3, formic, oxalic, and gluconic acids). If a mineral (inorganic) acid is used, then the resulting nanotubes will be carbon free. In order to prepare titania nanotubes having a carbon content in the range from 0 to about 20 atom % of carbon, a mixture of one or more mineral acids and one or more chlorine-free carboxylic acids is used in the electrolyte, together with a suitable concentration of a chloride ion donor such as a salt. If a lower carbon content is desired, then the method is repeated and the fraction of mineral acid is increased relative to the fraction of chlorine-free carboxylic acid. If, on the other hand, a higher carbon content is desired, then the fraction of the carboxylic acid is increased relative to the fraction of mineral acid.

In another method, the carbon content of titania nanotubes can be adjusted in the range of about 20 to about 40 or even 50 atom %. A method utilizing trichloroacetic acid or another chlorine-containing organic acid as described above is first used to produce titania nanotubes containing carbon in the range from about 20 to about 50 atom %. Then, if a lower carbon content is desired, then the fraction of chlorine-free organic acid is increased relative to the fraction of chlorine-containing organic acid. If, on the other hand, a higher carbon content is desired, then the fraction of the chlorine-containing organic acid is increased relative to the fraction of chlorine-free organic acid.

As an optional step following the production of titania nanotubes, the nanotubes can be annealed. Annealing can aid in the removal of elements that are not incorporated in the nanotube lattice. For example, the nanotubes can be dried from an acetone suspension, and then heat treated at a temperature ranging from about 100° C. to about 300° C. for about 15 to 60 minutes. Preferably the nanotubes are stored under vacuum, or in an inert atmosphere such as argon, during the annealing process. Nanotubes prepared by one of the above methods for introducing carbon can be annealed. Is such cases, the annealing process helps to remove extraneous or adsorbed carbon from the nanotubes.

The above-described methods of preparing titania nanotubes in a chloride-containing electrolyte can be employed to effectively and rapidly produce such nanotubes from titanium metal. However, in a variant of the method, the slow onset of fluoride-induced titania nanotube formation is combined with the much faster kinetics of catalysis by chloride ions, resulting in a two-stage process. Fluoride catalysis permits an initially more uniform growth of small nanotube structures across a titanium surface, while chloride catalysis promotes rapid and more complete conversion of Ti metal into $TiO_2$ nanotubes. The first stage of the combined process involves a brief anodization (e.g., from about 5 to about 30 minutes at about 10 to about 20 V) in a fluoride ion containing electrolyte. In some embodiments the electrolyte for this first stage is also substantially free of chloride ions. This first stage is performed just long enough to effectively coat the surface of the titanium anode with nucleation structures, such as short nanotubes, whose subsequent growth and elongation are driven to completion in a chloride-containing electrolyte according to the present invention. Advantages of this combined two-stage approach can include more uniform nanotube structures and more complete conversion of the titanium anode material into nanotubes.

One or more of the components needed for preparing titania nanotubes according to the invention may be conveniently provided in the form of a kit. A kit will optionally include instructions for use of the components to prepare titania nanotubes according to a method of the invention, as well as one or more materials or reagents useful in performing anodization of titanium to form nanotubes. A kit may also include packaging materials.

For example, a kit for preparing titania nanotubes can include any of the following components either alone or in combination: a titanium anode, or material from which to prepare a titanium anode; a cathode, such as a platinum electrode, or material from which to prepare a cathode; an electrolyte solution containing at least about 1 mM chloride and having a pH in the range of about 1 to about 7, either as an aqueous solution or as a mixture of dry ingredients to which the user will add solvent; and instructions for preparing titania nanotubes according to any of the methods described herein. A kit may foresee that the user will supply one or more ingredients (e.g., materials or reagents) for preparing titania nanotubes.

The titania nanotubes made by any of the above described methods can be used as components of a composite material, where they can be utilized, for example, to strengthen or reinforce the material. The titania nanotubes produced by any of the above methods also can be used as components of a microfabricated device, a hydrogen sensor, or a solar cell.

The following examples are presented to illustrate the advantages of the present invention and to assist one of ordinary skill in making and using the same. These examples are not intended in any way otherwise to limit the scope of the disclosure.

EXAMPLES

Example 1

Formation of Titania Nanotubes Using Different Electrolyte Solutions

In order to fabricate titania nanotubes, titanium foil (Alfa Aesar 99%, 0.127 mm thickness) was anodized at room temperature in a standard electrochemical cell with the foil serving as anode and a platinum mesh serving as cathode. Magnetic stirring was used to ensure the reagents remained properly mixed at all times. All acids and chemicals were reagent grade and acquired from Alfa Aesar. The electrolyte consisted of a solution with pH around 1.5 and a chloride ion concentration of 0.4 M. The electrolyte contained one of a series of acids, present at a concentration of 0.5. All acids chosen had high dissociation constants so that differences in dissociation were small enough to be neglected. The anodization conditions for each acid are summarized in Table 1.

TABLE 1

Experimental conditions for the different acids used.

| Acid name | Acid concentration (mol/L) | $NH_4Cl$ concentration (mol/L) | Solution pH |
|---|---|---|---|
| TCA | 0.50 | 0.40 | 1.20 |
| Oxalic | 0.50 | 0.40 | 1.30 |
| Gluconic | 0.50 | 0.40 | 1.75 |
| Formic | 0.50 | 0.40 | 1.80 |
| Hydrochloric | 0.02 | 0.40 | 1.50 |
| Sulfuric | 0.05 | 0.40 | 1.50 |

The anode active area was kept constant at 1 cm×2.5 cm, and the electrode spacing was 4 cm. For the anodization of each sample, a constant voltage was provided by an Agilent 6811B power supply, which was also employed for measuring and recording the external current. The morphology of the anodized samples was analyzed with a Scanning Electron Microscope (SEM, Hitachi S4800). Energy Dispersive X-Ray analysis was carried out using an EDAX Genesis 4000 system. High purity TiC and $TiO_2$ were used to calibrate the quantification algorithm. Powder diffraction spectra were taken in a Rigaku 2200 diffractometer using CuK α-radiation.

Samples were anodized in an electrolyte solution (defined above) for each of the acids at fixed voltages as low as 8V and as high as 20V. For all solutions, anodization at lower voltages (typically below 11V) did not yield any nanotubes. However, for voltages above a specific threshold, titania nanotubes were found to form with each of the acids chosen, namely oxalic, formic, trichloroacetic, gluconic, hydrochloric, and sulfuric acids. SEM images of the nanotubes formed can be seen in FIGS. 2 and 3. There were no significant morphological differences among the titania nanotubes manufactured in the different acids (see Table 2). There appeared to be no variation of nanotube diameter with voltage. Diameters of all tubes were between 15 and 35 nm with an average diameter of about 25 nm. Wall thickness was typically around 5 nm. Average diameters for different acids and anodization voltages are summarized in Table 2.

TABLE 2

Tube diameters for different experimental conditions (no significant dependence with the nature of acid, or anodization voltage observed).

| Acid name | Voltage (V) | Diameter (nm) | Acid name | Voltage (V) | Diameter (nm) |
|---|---|---|---|---|---|
| Gluconic | 12 | 25.3 ± 3.5 | Formic | 12 | 26.3 ± 5.3 |
| Trichloroacetic | 14 | 25.5 ± 3.8 | Formic | 13 | 25.8 ± 4.3 |
| Oxalic | 15 | 24.0 ± 2.5 | Formic | 14 | 23.3 ± 4.6 |
| Hydrochloric | 15 | 24.1 ± 2.8 | Formic | 15 | 26.4 ± 5.5 |
| Sulfuric | 13 | 21.4 ± 3.2 | Formic | 18 | 28.6 ± 4.1 |

Example 2

Relation of Anodization Current to Anodization Voltage

If the anodization voltage was set above the threshold voltage, the anodization current reached a nonzero plateau (or asymptote) that was approximately maintained until the sample was completely consumed by the anodization process and started to disintegrate. See for instance the curves in FIG. 4 with applied voltage >11V. The first signs of sample corrosion appeared usually within one minute after anodization started. The magnitude of this plateau was a good indication of the reactivity of the sample and was found to be in good agreement with the visible effects of the reaction rate (the magnitude of gas formation at the cathode, and the speed of the sample corrosion at the anode).

FIG. 5 is a plot of the average height of the anodization current plateau (IP) for different voltages and organic acids (the average taken over an interval from 60 s to 160 s). The average anodization current (IP) increased monotonically with the applied voltage for every acid used. The data for every acid, except oxalic acid, could be fitted to a smooth curve. (It was observed that, contrary to all the other acids, the 0.4M ammonium chloride formed a saturated solution and did not completely dissolve in the oxalic acid solution). It appeared that the dissolution continued during the course of the reaction as chloride ions were being consumed at the anode. From the plots, however, it was clear that nanotube formation was accompanied by a drastic increase in anodization current. Furthermore, from these curves an approximate value of the threshold voltage could be derived for each of the acids used. For all voltages below the threshold, the average plateau current was less than 2 mA. On the other hand, voltages only 0.5V above the threshold value yielded a plateau current that was at least an order of magnitude larger. The threshold voltage appeared to be somewhat particular to the acid (or pH) used, but the values for the studied acids nonetheless lie in a very narrow range between 10.5 and 12V. There also appear to be a trend that a higher pH resulted in a higher anodization current for any given value.

Example 3

Atomic Composition of Titania Nanotubes

The atomic composition of the nanotubes was analyzed using Energy Dispersive X-ray analysis (EDX). A summary of the quantification results is given in Table 3. A significant amount of carbon was found in nanotubes fabricated in every one of the organic acids. The carbon content of tubes grown in formic, oxalic and gluconic acid was virtually the same—around 20%. The only exception was trichloroacetic acid, which resulted in tube bundles with a carbon content of up to 45%. The number of carbon atoms in the organic anion did not appear to be a factor in the final carbon content, since tubes made in formic (1 C atom), oxalic (2 C atoms) and gluconic (6 C atoms) acids all had virtually the same carbon content. However, the presence of Cl atoms in trichloroacetic acid increased the incorporation of carbon into the nanotubes.

TABLE 3

Atomic percentages of carbon, oxygen, chlorine, and titanium in the titania nanotubes for different acid solutions used.

| Acid name | Ti (at %) | O (at %) | C (at %) | Cl (at %) | S (at %) |
|---|---|---|---|---|---|
| Trichloroacetic | 20 | 30 | 45 | 5 | — |
| Oxalic | 22 | 51 | 21 | 6 | — |
| Gluconic | 24 | 52 | 20 | 4 | — |
| Formic | 26 | 54 | 16 | 4 | — |
| Hydrochloric | 31 | 65 | — | 4 | — |
| Sulfuric | 30 | 63 | — | 3 | 4 |

Example 4

X-Ray Diffraction Analysis of Titania Nanotubes

Figure 7:
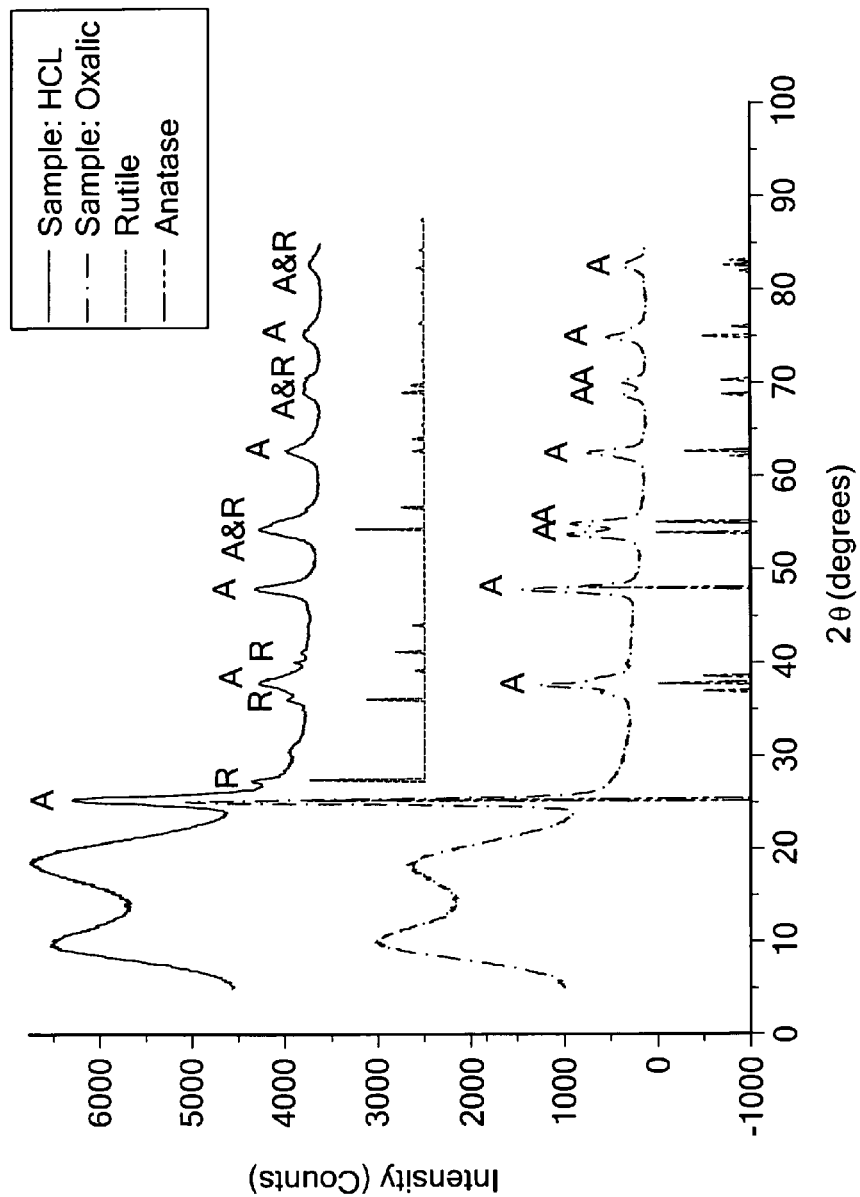
FIG. 7 shows X-ray diffraction powder spectra of two titania nanotube samples, one prepared in 0.02M hydrochloric acid (upper trace), and the other prepared in 0.5M oxalic acid (lower trace). The samples were annealed at 400° C. in an argon atmosphere for 4 h before being powdered. The broad peaks at 2θ angles of approximately 10° and 18.6° were also consistently observed, irrespective of the acid used. Also shown as a reference are the powder diffraction patterns of anatase (PDF 21-1272) and rutile (PDF 21-1276).

In order to determine the phase of the titania nanotubes, precipitate was scraped from the anodized samples where it was confirmed nanotubes have formed. This precipitate was annealed at 400° C. in an argon atmosphere for 4 hours and powdered. The powder X-ray diffraction spectra of some of the samples thus analyzed is shown in FIG. 7. While the powder diffraction patterns indicated that samples were amorphous prior to annealing, the annealed samples have a distinct anatase pattern (for example, the oxalic acid curve in FIG. 7), and in some cases traces of rutile structure also emerged (for example, the HCl curve in FIG. 7). The interpretation of these results is that the as-fabricated tubes were amorphous titania. This conclusion is supported by the EDX data for the chlorine-based tubes fabricated in sulfuric and hydrochloric acid (that is, the non-organic acids) that revealed an approximately 1:2 ratio of Ti to O. The X-ray diffraction data did not, however, show any trace of graphite or contain any peaks indicating the presence of titanium oxycarbide ($TiC_xO_y$) for the organic acid samples.

Example 5

Two-Stage Catalysis of Titania Nanotube Formation

A titanium foil anode was subjected to a first stage preconditioning by a first anodization in 0.5 wt % hydrofluoric acid solution at 13V for 20 minutes at room temperature. The resulting structure is shown in FIG. 8A. The electrolytic cell was then washed with deionized water and a chloride-containing electrolyte (0.2 M ammonium chloride, 20 mM HCl, pH 1.65) was added. The second anodization was then carried out at 13 V anodization voltage, resulting in full conversion to titania nanotubes across the anode as shown in FIG. 8B.

While the present invention has been described in conjunction with a preferred embodiment, one of ordinary skill, after reading the foregoing specification, will be able to effect various changes, substitutions of equivalents, and other alterations to the compositions and methods set forth herein. It is therefore intended that the protection granted by Letters Patent hereon be limited only by the definitions contained in the appended claims and equivalents thereof.

REFERENCES

1. M. Paulose, G. K. Mor, O. K. Varghese, K. Shankar, and C. A. Grimes: Visible light photoelectrochemical and water-photoelectrolysis properties of titania nanotube arrays. J. Photochem. Photobiol., A 178, 8 (2006).
2. J. H. Park, S. Kim, and A. J. Bard: Novel Carbon-Doped TiO2 Nanotube Arrays with High Aspect Ratios for Efficient Solar Water Splitting. Nano Lett. 6, 24 (2006).
3. X. Quan, S. Yang, X. Ruan, and H. Zhao: Preparation of Titania Nanotubes and Their Environmental Applications as Electrode. Environ. Sci. Technol. 39, 3770 (2005).
4. M. Paulose, O. K. Varghese, G. K. Mor, C. A. Grimes, and K. G. Ong: Unprecedented ultra-high hydrogen gas sensitivity in undoped titania nanotubes. Nanotechnology 17, 398 (2006).
5. S. Liu and A. Chen: Coadsorption of Horseradish Peroxidase with Thionine on TiO2 Nanotubes for Biosensing. Langmuir 21, 8409 (2005).
6. B. Yang, M. Uchida, H.-M. Kim, X. Zhang, and T. Kokubo: Preparation of bioactive titanium metal via anodic oxidation treatment. Biomaterials 25, 1003 (2004).
7. V. Zwilling and E. Darque-Ceretti: Characterisation D'Oxydase Anodiques Poreux et Compacts de Titane et de TaV6. Annales de chimie—Science des matériaux 22, 482 (1997).
8. V. Zwilling, M. Aucouturier, and E. Darque-Ceretti: Anodic oxidation of titanium and TA6V alloy in chromic media. An electrochemical approach. Electrochim. Acta 45, 921 (1999).
9. D. Gong, C. A. Grimes, and O. K. Varghese: Titanium oxide nanotube arrays prepared by anodic oxidation. J. Mater. Res. 16, 3331 (2001).
10. Q. Cai, M. Paulose, O. K. Varghese, and C. A. Grimes: The effect of electrolyte composition on the fabrication of self-organized titanium oxide nanotube arrays by anodic oxidation. J. Mater. Res. 20, 230 (2005).
11. J. Macák, M., H. Tsuchiya, and P. Schmuki: High-aspect-ratio TiO2 nanotubes by anodization of titanium. Angew Chem Int Ed Engl 44, 2100 (2005).
12. J. M. Macak, H. Tsuchiya, L. Taveira, S. Aldabergerova, and P. Schmuki: Smooth anodic TiO2 nanotubes. Angew Chem Int Ed Engl 44, 7463 (2005).
13. C. Ruan, M. Paulose, O. K. Varghese, G. K. Mor, and C. A. Grimes: Fabrication of Highly Ordered TiO2 Nanotube Arrays Using an Organic Electrolyte. J. Phys. Chem. B 109, 15754 (2005).
14. M. Paulose, K. Shankar, S. Yoriya, H. E. Prakasam, O. K. Varghese, G. K. Mor, T. A. Latempa, A. Fitzgerald, and C. A. Grimes: Anodic Growth of Highly Ordered TiO2 Nanotube Arrays to 134. J. Phys. Chem. B 110, 16179 (2006).
15. K. Nakayama, T. Kubo, A. Tsubokura, Y. Nishikitani, and H. Masuda: Anodic Formation of High-Aspect-Ratio Titania Nanotubes. ECS Meeting Abstracts 502, 819 (2006).
16. X. Yu, Y. Li, W. Ge, Q. Yang, N. Zhu, and K. Kalantar-Zadeh: Formation of nanoporous titanium oxide films on silicon substrates using an anodization process. Nanotechnology 17, 808 (2006).
17. T. Kasuga, M. Hiramatsu, A. Hoson, T. Sekino, and K. Niihara: Formation of Titanium Oxide Nanotube. Langmuir 14, 3160 (1998).

What is claimed is:

1. A method of preparing titania nanotubes, comprising the steps of:
    (a) providing a titanium anode and an inert cathode, the anode and cathode in electrical contact through an electrolyte solution comprising chloride, wherein the electrolyte solution comprises a chloride salt selected from the group consisting of ammonium chloride, sodium chloride, and potassium chloride; and
    (b) establishing a voltage between said anode and said cathode and rapidly forming titania nanotubes at the anode;
wherein the titania nanotubes are formed a rate of several tens of micrometers length in 80 seconds.

2. The method of claim 1, wherein the nanotubes that form have a length of at least 1 µm.

3. The method of claim 2, wherein the nanotubes that form have a length of at least 50 µm.

4. The method of claim 1, wherein the electrolyte solution comprises ammonium chloride.

5. The method of claim 1, wherein the chloride salt is present in a range from about 0.05 M to about 0.4 M.

6. The method of claim 1, wherein the electrolyte solution comprises an acid.

7. The method of claim 6, wherein the acid is an inorganic acid or an organic acid.

8. The method of claim 7, wherein the acid is a mineral acid selected from hydrochloric acid and sulfuric acid.

9. The method of claim 7, wherein the organic acid is a carboxylic acid selected from formic acid, acetic acid, oxalic acid, gluconic acid, and trichloroacetic acid.

10. The method of claim 6, wherein the acid concentration is about 0.5 M.

11. The method of claim 6, wherein the electrolyte comprises a mixture of one or more mineral acids and one or more organic acids, and the carbon content of the resulting nanotubes is in the range from 0 atom % to about 40 atom %.

12. The method of claim 11, further comprising the step of annealing the nanotubes by heating them at about 100° C. to about 300° C. in an inert atmosphere or under vacuum for about 15 min to about 60 min.

13. The method of claim 6, wherein the electrolyte comprises a mixture of one or more chlorine-free carboxylic acids and one or more chlorine-containing carboxylic acids, and the carbon content of the resulting nanotubes is in the range from about 20 atom % to about 50 atom %.

14. The method of claim 13, further comprising the step of annealing the nanotubes by heating them at about 100° C. to about 300° C. in an inert atmosphere or under vacuum for about 15 min to about 60 min.

15. The method of claim 1, wherein the electrolyte solution is essentially free of fluoride ions.

16. The method of claim 1, wherein the voltage is in the range from about 10V to about 20V.

17. The method of claim 1, wherein the anode consists essentially of a titanium metal foil.

18. The method of claim 1, wherein the cathode consists essentially of platinum metal or graphite.

19. The method of claim 1, wherein the nanotubes comprise at least 40 atom % of carbon.

20. The method of claim 1, wherein the nanotubes formed are organized as bundles or arrays of nanotubes aligned in parallel.

21. The method of claim 1, wherein the nanotubes comprise from about 0 to about 50 atom % carbon.

22. The method of claim 1, further comprising the step of annealing the nanotubes by heating them at about 100° C. to about 300° C. in an inert atmosphere or under vacuum for about 15 min to about 60 min.

23. A method of adjusting the carbon content of titania nanotubes between about 0 atom % and about 40 atom % of carbon, comprising the steps of:
 (a) preparing a first set of nanotubes according to the method of claim 1, wherein the electrolyte solution comprises a mixture of an inorganic acid and an organic acid;
 (b) determining the carbon content of said nanotubes; and
 (c) preparing a second set of nanotubes with a different mixture of an inorganic acid and an organic acid, wherein increasing the proportion of said organic acid relative to said inorganic acid increases the carbon content of the second set of nanotubes, and decreasing the proportion of said organic acid relative to said inorganic acid decreases the carbon content of the second set of nanotubes.

24. A method of adjusting the carbon content of titania nanotubes between about 20 atom % and about 50 atom % of carbon, comprising the steps of:
 (a) preparing a first set of nanotubes according to the method of claim 1, wherein the first electrolyte solution comprises a mixture of an inorganic acid, trichloroacetic acid as a first carboxylic acid and a second carboxylic acid;
 (b) determining the carbon content of said nanotubes; and
 (c) preparing a second set of nanotubes, wherein the second electrolyte solution comprises an inorganic acid and a different proportion of trichloroacetic acid and said second carboxylic acid relative to said first electrolyte solution, wherein increasing the proportion of trichloroacetic acid relative to said second carboxylic acid increases the carbon content of the second set of nanotubes, and decreasing the proportion of said trichloroacetic acid relative to said second carboxylic acid decreases the carbon content of the second set of nanotubes.

25. The method of claim 1, further comprising the steps of, prior to step (a):
 (i) providing a titanium anode and an inert cathode, the anode and cathode in electrical contact through an electrolyte solution comprising about 0.25 wt % to about 1.0 wt % of hydrofluoric acid; and
 (ii) establishing a voltage in the range from about 10V to about 20V between the anode and the cathode for a time in the range from about 5 to about 30 minutes, whereby the titanium surface is pre-conditioned for the formation of titania nanotubes in a chloride-containing electrolyte solution.

26. The method of claim 25, wherein said electrolyte solution is chloride-free.

27. The method of claim 1, wherein the electrolyte solution has a pH in the range from about 1 to about 7.

28. The method of claim 27, wherein the electrolyte solution has a pH in the range from about 1 to about 5.

29. The method of claim 27, wherein the electrolyte solution has a pH in the range from about 1 to about 2.

30. The method of claim 1, wherein the electrolyte solution has a pH of about 1.5.

31. The method of claim 1, wherein the electrolyte solution comprises at least 0.4M of said chloride salt.

32. The method of claim 31, wherein said voltage is at least 11 volts.

* * * * *